United States Patent Office
3,677,737
Patented July 18, 1972

3,677,737
COMBATING UNWANTED VEGETATION WITH 2-(2',5' - DIMETHYLPYRROLIDINYL) - 5 - ARYL-1,3,4-THIADIAZOLES
Norman A. Dahle, Mission, Kans., assignor to Gulf Research & Development Company, Pittsburgh, Pa.
No Drawing. Filed Oct. 24, 1969, Ser. No. 869,328
Int. Cl. A01n 9/12
U.S. Cl. 71—90                                 4 Claims

ABSTRACT OF THE DISCLOSURE

A small group of 2-(2',5'-dimethylpyrrolidinyl)-5-phenyl-1,3,4-thiadiazoles, in which the phenyl ring may have chloro or methyl substituents, possess herbicidal properties superior to compounds of similar structural formulas. Various compounds of the group are useful for controlling unwanted vegetation in soybeans, cotton and small grains.

DESCRIPTION OF THE INVENTION

A small group of 2-disubstituted amino-5-aryl-1,3,4-thiadiazoles have been found to be unusually active, selective herbicides. These are compounds having the generic structural formula,

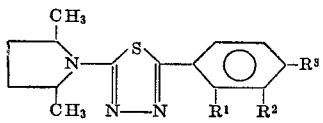

in which $R^1$, $R^2$ and $R^3$ are selected from the group consisting of hydrogen, chloro and methyl substituent groups.

It has been suggested in U.S. Pat. 3,429,688 that certain anilino thiadiazoles, as for example, including compounds of types represented by the structural formulas

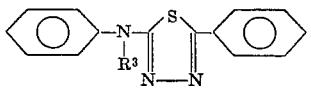

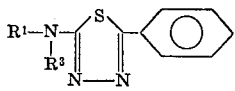

in which $R^1$ is phenyl, allyl or methyl and $R^3$ is hydrogen, lower alkyl or acyl are useful as herbicides. It has been found, however, that many compounds having similar structural formulas are relatively ineffective as herbicides, as shown below in tabulated results of greenhouse tests.

(A) Methods of synthesis 5-aryl-2H-tetrazoles.—The tetrazole starting material used in this synthesis scheme was prepared by the method of W. G. Finnegan, R. A. Henry and R. Lofquist which utilizes the reaction of an arylnitrile with a mixture of ammonium chloride and sodium azide in dimethyl formamide containing a catalytic amount of lithium chloride: Finnegan, W. G., Henry, R. A., and Lofquist, R. J. Am. Chem. Soc. 80, 3908 (1958); also U.S. Pat. 2,977,372.

2-chloro-5-phenyl-1,3,4-thiadiazole.—This step in the synthesis scheme is believed to be novel:
A stirred mixture of 74.4 g. (0.50 mole) of 5-phenyl-2H-tetrazole and 74.0 g. (0.65 mole) of thiophosgene in 550 ml. of dimethoxyethane was allowed to reflux overnight. The reaction mixture was cooled and filtered. The filtrate was evaporated to dryness at reduced pressure and the resulting residue leached with two 200-ml. portions of hexane. Upon cooling and concentration of the combined hexane portions 40.5 g. of the desired product was obtained: M.P. 82–84° (lit. 86–88°).

2-(2',5'-dimethylpyrrolidinyl) - 5 - phenyl - 1,3,4 - thiadiazole.—A mechanically stirred mixture of 69.3 g. (0.35 mole) of 2-chloro-5-phenyl-1,3,4-thiadiazole, 64.5 g. (0.70 mole) of 2,5 - dimethylpyrrolidine (commercial material) and 34.6 g. (0.35 mole) of triethylamine in 400 ml. of benzene was heated at reflux for 42 hours. The benzene was extracted with two 100 ml. portions of water, dried ($MgSO_4$) and taken to dryness at reduced pressure giving 78.2 g. of a crude product with a melting point of 69–75°. A 53.2 g. portion of this material was recrystallized from hexane giving 45.0 g.: M.P. 76–78°. Nonaqueous titration with perchloric acid in acetic acid indicated that the material is greater than 95% pure.

An alternate method of purification was performed on the remaining 25 g. of crude product. The crude product was dissolved in 500 ml. of ether and the resulting solution cooled to 10–12° C. while a slow stream of hydrogen chloride was introduced. After precipitation of the product was complete, the insoluble material was collected and washed well with ether. The hygroscopic hydrochloride was added portionwise to a mixture of 400 ml. of 5% sodium hydroxide and 300 ml. of ethyl acetate. The ethyl acetate layer was separated, dried, and evaporated to dryness. The product was recrystallized from hexane giving 18.5 g. of the title compound: M.P. 77–79°.

2 - aryl-5-dimethylamino-(diethylamino)-1,3,4-thiadiazoles.—The preparation of 2 - dimethylamino-5-phenyl-1,3,4,-thiadiazole will serve as an illustration of the general procedure employed to prepare these compounds.

A stirred mixture of 14.6 g. (0.1 mole) of 5-phenyl-2H-tetrazole and 13.5 g. (0.11 mole) of dimethylthiocarbamyl chloride was heated at reflux for 18 hours. The mixture was evaporated to dryness and the resulting residue allowed to stir with 150 ml. of 5% sodium hydroxide for 4 hours. The insoluble material was separated, washed well with water and recrystallized from ethyl acetate to give 8.3 g. (43%): M.P. 97–99° C. The infrared spectrum shows a strong band at 6.5µ, a feature characteristic of this group of compounds.

USE OF THE COMPOUNDS AS HERBICIDES

So as to illustrate clearly the selective phytotoxic properties of the herbicides, a group of controlled greenhouse experiments is described below.

(1) Post emergent use

An aqueous dispersion of each active compound was prepared by combining 0.4 gram of the compound with about 4 ml. of a solvent-emulsifier mixture (3 parts of a commercial polyoxyethyltated vegetable oil emulsifier, one part xylene, one part kerosene) and then adding water, with stiring, to a final volume of 40 ml.

The species of plants on which each compound was to be tested were planted in four-inch pots in a greenhouse. Ten to eighteen days after emergence of the plants, three pots were sprayed with an aqueous dispersion of the active compound prepared as described above, at a rate of 5 lb. of active compound per acre and at a spray volume of 60 galons per acre. Approximately one week after the spray application the plants were observed and the results rated according to the following schedule:

TYPE OF ACTION

C=chlorosis (bleaching)
N=necrosis
G=growth inhibition
F=formative effect (abnormal form of growth)
K=non-emergence

DEGREE

0 = no effect
1 = slight effect
2 = moderate effect
3 = severe effect
4 = maximum effect (all plants died)

The same rating schedule was employed to judge pre-emergent results obtained according to the procedure below.

(2) Pre-emergent use

A solution of each active compound was prepared by dissolving 290 mg. of the compound to be tested in 200 ml. of acetone. Disposable paper trays about 2 inches deep and half the size of ordinary greenhouse flats were prepared and seeded with a variety of species of plant seeds, then sprayed with the acetone solution at the rate of 10 lb. of active chemical per acre of sprayed area. One flat, which had been seeded with alfalfa, brome, flax, oats, radishes and sugar beets was held at 75° F. day temperature; another seeded with corn, cox-comb, cotton, crabgrass, millet and soybeans was held at 85° F. Twenty-one days after seeding and treatment the flats were examined and herbicidal effect was rated according to the above schedule.

Both post-emergent and pre-emergent results are set forth in the following table.

USE OF 2-DISUBSTITUTED AMINO-5-ARYL-1,3,4-THIADIAZOLES AS HERBICIDES

| Structural formula and B.P. or M.P. | | Crabgrass | Coxcomb | Brome | Millet | Soybean | Cotton | Alfalfa | Oats | Corn | Flax | Radish | Sugar beet | Wheat | Grain sorghum | Tomato |
|---|---|---|---|---|---|---|---|---|---|---|---|---|---|---|---|---|
| (Structure 1) M.P. 119–21° C. | Post | | 0 | 0 | N1 | N1 0 | N3 G3 0 | N4 0 | N1 0 | N1 G1 0 | N2 G2 0 | N1 G1 0 | N4 0 | N1 | 0 | N4 |
| | Pre | | | | | | | | | | | | | | | |
| (Structure 2) CH₃ CH₃ M.P. 80–81° C. | Post | N4 | N4 | 0 | N4 N4 | N3 G3 N1 | N1 G1 0 | N4 N4 | N4 0 | N1 G1 0 | N1 0 | N3 G3 N4 | N4 N4 | N4 | 0 | N4 |
| | Pre | | | N3 G3 | | | | | | | | | | | | |
| (Structure 3) —N(C₃H₇)₂ B.P. 154–58°/0.15 mm. | Post | 0 | 0 | 0 | 0 | 0 | 0 | 0 | 0 | 0 0 | N2 G2 0 | N1 G1 0 | N1 G1 0 | 0 | 0 | 0 |
| | Pre | | | | | | | | | | | | | | | |
| (Structure 4) —N(CH₃)₂ CH₃ CH₃ | Post | 0 | 0 | 0 | 0 | 0 | N2 G2 0 | 0 | 0 | 0 | N1 0 | N1 G1 0 | N2 G2 0 | 0 | 0 | N4 |
| | Pre | | | | | | | | | | | | | | | |
| (Structure 5) CH₃ M.P. 177–79° C. | Post | 0 | 0 | 0 | 0 | 0 | 0 | 0 | 0 | 0 0 | 0 0 | N1 G1 0 | N1 G1 0 | 0 | 0 | 0 |
| | Pre | | | | | | | | | | | | | | | |
| (Structure 6) CH₃ M.P. 80–82° C. | Post | 0 | 0 | | 0 | 0 | 0 | 0 | 0 | 0 | N1 G1 0 | N1 G1 0 | N1 G1 0 | 0 | 0 | N1 |
| | Pre | | | | | | | | | | | | | | | |

USE OF 2-DISUBSTITUTED AMINO-5-ARYL-1,3,4-THIADIAZOLES AS HERBICIDES—Continued

| Structural formula and B.P. or M.P. | | Crabgrass | Coxcomb | Brome | Millet | Soybean | Cotton | Alfalfa | Oats | Corn | Flax | Radish | Sugar beet | Wheat | Grain sorghum | Tomato |
|---|---|---|---|---|---|---|---|---|---|---|---|---|---|---|---|---|
| 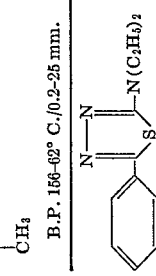 B.P. 166-62° C./0.2-25 mm. | Post.<br>Pre. | 0 | 0 | 0 | N1<br>G1 } 0 | 0<br>0 | N1 } 0 | N1<br>G1 } | 0 } 0 | N2<br>G1 0 | N1<br>G1 0 | N1<br>G1 0 | N1<br>G1 0 | 0<br>0 | 0<br>0 | N1<br>0 |
| 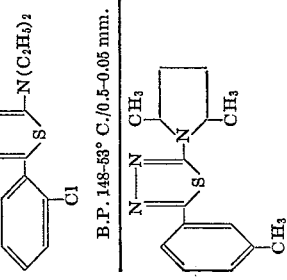 B.P. 148-53° C./0.5-0.05 mm. | Post. | K1 | N4 | K4 | N1 | N1 | N1 } | N2<br>G2 } | 0 | 0 | N1 } | N1<br>G1 | N2<br>G2 } | 0 | 0 | 0 |
| 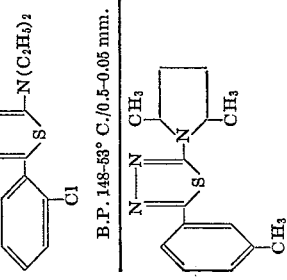 B.P. 165-95° C./0.25 mm. | Post.<br>Pre. | K3<br>G3 } | N4 | K4 | N4<br>K3 | N3<br>G2<br>K3 | N4<br>0 } | N4<br>K3<br>G3 } | N4<br>G1 } | N4<br>0 | N1 } | N1<br>G1 | N2<br>G2 } | N4<br>0 | N4<br>N1<br>G1 } | N4 |
| 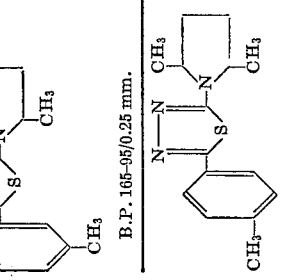 M.P. 69-81° C. | Post.<br>Pre. | | N4 | K4 | N4<br>K4 | N4<br>G1 | N4<br>0 } | N4<br>K4 | N4<br>G1 | N4<br>K4 | N4<br>K4 | N4<br>K4 | N4<br>K3 | N4 | N4 | N4 |
| 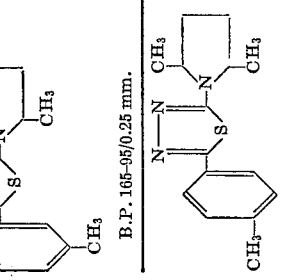 M.P. 126-7° C. | Post.<br>Pre. | N3<br>G3 } | N4 | K4 | N4<br>K4 | N4<br>0 | N4<br>0 } | N4<br>K4 | N4<br>K4 | N4<br>0 | N4<br>K4 | N4<br>K4 | N4<br>K4 | N4 | N4 | N4 |
| 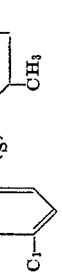 | | | | | | | | N4<br>N3<br>G3 | N4<br>N2<br>G2 | | | | N4<br>K4 | N4<br>K4 | N4<br>N3<br>G2 } | 0 | N4 |

The unique properties of the dimethylpyrrolidinyl compounds are clearly evident from the test results. The difference between pyrrolidinyl- and corresponding dimethylpyrrolidinyl compounds is particularly surprising. In contrast to the improvement obtained by two methyl substituents on the pyrrolidine ring, it appears that if methyl substituents are placed instead on the phenyl ring they have the opposite effect. In general, substituents in 3- and 4- positions on the phenyl ring appear to reduce the effectiveness of the 2-dialkylamino-5-phenyl-1,3,4-thiadiazoles as herbicides. The dimethylpyrrolidinyl thiadiazoles may be used to control unwanted vegetation in a variety of crops, including soybeans, cotton and small grains, depending on the specific compound chosen for the purpose.

I claim:

1. Combating unwanted vegetation by applying to the locus of the vegetation an effective amount of 2-(2′,5′-dimethylpyrrolidinyl)-5-phenyl-1,3,4-thiadiazole.

2. Combating unwanted vegetation by applying to the locus of the vegetation an effective amount of 2-(2′,5′-dimethylpyrrolidinyl)-5-(m-tolyl)-1,3,4-thiadiazole.

3. Combating unwanted vegetation by applying to the locus of the vegetation an effective amount of 2-(2′,5′-dimethylpyrrolidinyl)-5-(p-tolyl)-1,3,4-thiadiazole.

4. Combating unwanted vegetation by applying to the locus of the vegetation an effective amount of 2-(2′,5′-dimethylpyrrolidinyl) - 5 - (p-chlorophenyl) - 1,3,4-thiadiazole.

References Cited
UNITED STATES PATENTS 3,522,267   6/1970   Duerr et al. _____ 71—90

JAMES O. THOMAS, Jr., Primary Examiner

U.S. Cl. X.R.

260—306.8